Sept. 18, 1951  S. W. CRAIGIE  2,568,386
CLAMPING DEVICE

Filed May 11, 1950  2 Sheets-Sheet 1

Inventor
Samuel W. Craigie
By Ralph B. Stewart
attorney

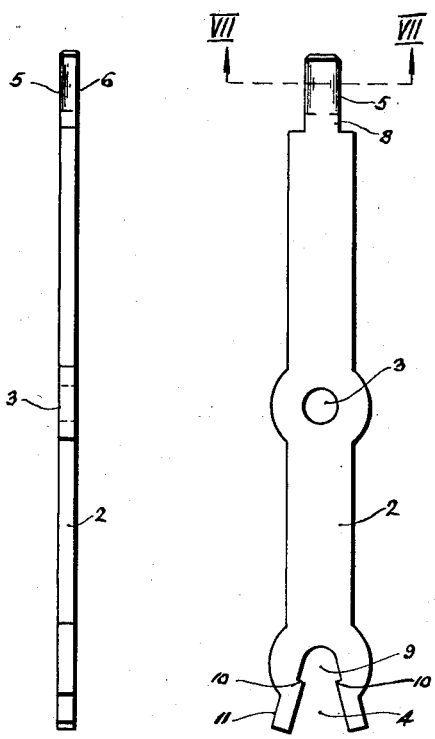

Patented Sept. 18, 1951

2,568,386

UNITED STATES PATENT OFFICE 2,568,386

CLAMPING DEVICE

Samuel William Craigie, Chelmsford, England, assignor to Aviation Developments Limited, Welwyn Garden City, England, a joint-stock company of England Application May 11, 1950, Serial No. 161,398
In Great Britain July 9, 1948

2 Claims. (Cl. 85—5)

This invention relates to clamping devices for temporarily holding together pieces of sheet material especially to facilitate riveting operation and the like.

Nut and screw operated clamping devices have already been proposed in which a clamping screw formed at one end with a claw for insertion through an aperture in, and engagement with the rear face of, material to be clamped, is slidable longitudinally in a body portion from which it projects at its other end to take a thumb-nut which, when tightened, bears upon the adjacent end of the housing so that the material is clamped between the claw and the other or abutment end of the housing.

In another known example, the body portion is formed by bending stiff wire in such a way that one end is simply looped around the clamping screw to constitute a seating for the thumb-nut and the other end is bent to surround the clamping screw near, and to extend as a tongue alongside, the latter towards its claw end to serve as a clamping abutment and also as a guide for insertion together with the clamping screw through an aperture in material to be clamped.

According to the invention, a device of this kind comprises a clamping screw one end of which is threaded and carries a nut and the other end of which is formed with a claw and a body portion comprising a length of strip metal which is formed intermediately of its length with an aperture to take the clamping screw, at one end with a tongue of reduced width and at the other end with a longitudinal slot, and is bent so that the tongue lies longitudinally alongside the shank of the screw and the slot embraces transversely the shank and tongue.

The slot is open at the end of the strip to present a fork, the limbs of which during assembly are bent together to grip the tongue between them.

One construction of the invention will now be described, by way of example, with reference to the accompanying drawings, in which:

Figure 5 is a side elevation of the stamped metal strip from which the holder of the device is made.

Figure 6 is a front elevation of the strip shown in Figure 5.

Figure 7 is a sectional end view on line VII—VII of Figure 6.

Figure 1:
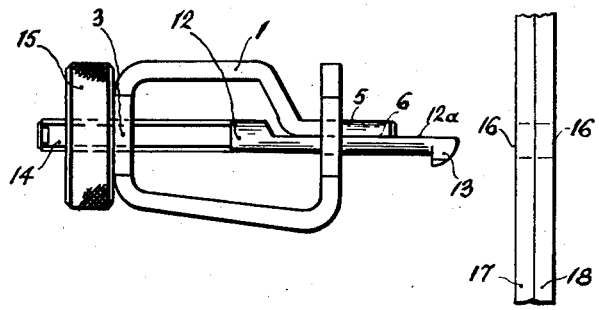
Figure 1 is a front elevation of the clamping device before it is inserted into the material to be clamped.

Referring now to the drawings, the holder 1 of the clamping device is stamped out from a sheet of metal in form of a strip 2 which has the aperture 3 punched out intermediately of its length and an outwardly diverging slot 4 at one end and a tongue 5 at its other end. The tongue 5 is flat throughout its length at that side corresponding to one face 6 of the strip and at its other face 7, except for a short length near its root end 8 which is left square, is semi-cylindrical.

At its inner end the diverging slot 4 is recessed at 9 to form a shoulder 10 on each limb 11.

Figures 2, 4:
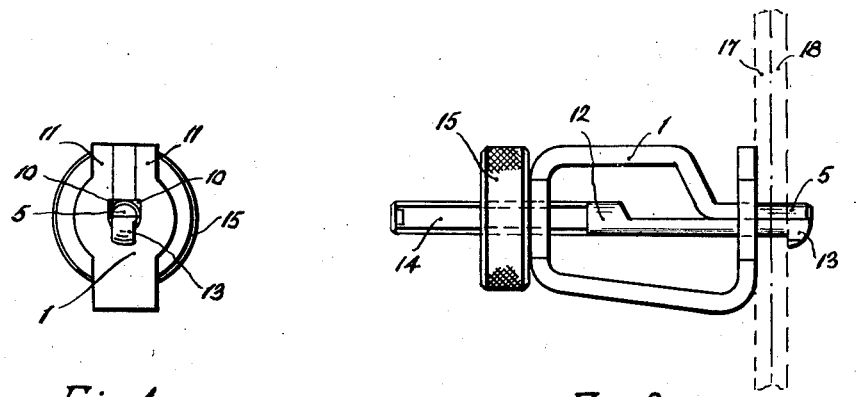
Figure 2 is a similar view to that of Figure 1 showing the device in a gripping position.
Figure 4 is an end view of the clamping device.
Figure 3:
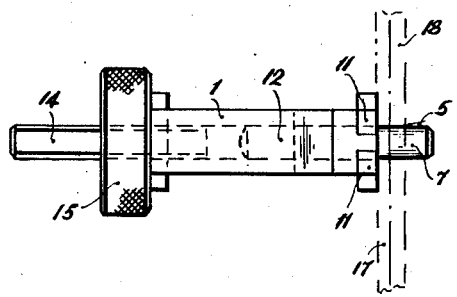
Figure 3 is a plan view of the clamping device.

The strip is bent about parallel, spaced lines, into the shape shown in Figure 2. After bending, the shoulders 10 of the strip 2 partly encircle the square portion of the tongue 5, the limbs 11 of the strip 2 being bent inwardly so that the square part 8 of the tongue 5 is engaged by the shoulders 10.

A clamping screw 12 formed at one end with a claw 13 and at its other end with a screw-threaded portion 14 is slidable longitudinally in the holder 1. The threaded portion 14 projects from the aperture 3 of the holder 1 to engage a thumb-nut 15 whilst the claw 13 is adapted for insertion into the aperture 16 of the sheets 17 and 18 to be clamped together.

On tightening the nut the latter bears upon the adjacent end of the holder 1 whilst the rear face of the claw 13 engages the outer face of the sheet 18 so that the sheets 17 and 18 are clamped between the claw 13 and the other or slotted end of the housing.

As is usual in such clamping devices the tongue 5 and the screw shank 12 adjacent the claw 13 will each be of substantially semi-circular cross-section with the flat faces 6 and 12A in contact where they extend alongside one another.

It will be seen that the construction according to the invention is almost, if not quite, as cheap to make as the wire construction above referred to and that its strength is comparable with that of the clamping device of which the body portion is formed by the turning from the solid.

It will be appreciated also that the forming of the body portion is simplified because all the bends in it are made about parallel lines.

I claim:

1. A clamping device of the kind referred to comprising a clamping screw one end of which is threaded and carries a nut and the other end of which is formed with a laterally extending claw, and a body member comprising a length of strip metal formed intermediately of its length with an aperture to slidably receive the clamping screw, at one end with a tongue of reduced width and at the other end with a longitudinal slot, and bent so that the tongue lies longitudinally alongside the shank of the screw opposite to said laterally extending claw and the slot embraces transversely the shank and tongue.

2. A clamping device, as set forth in claim 1, wherein the slotted portion of the strip metal is opened at the end of the strip to present a fork, the limbs of which are closed to embrace the tongue and screw shank.

SAMUEL WILLIAM CRAIGIE.

REFERENCES CITED

The following references are of record in the file of this patent:

UNITED STATES PATENTS

| Number | Name | Date |
| --- | --- | --- |
| 2,284,834 | Moler | June 2, 1942 |

FOREIGN PATENTS

| Number | Country | Date |
| --- | --- | --- |
| 570,482 | Great Britain | July 9, 1945 |